United States Patent [19]

Endō et al.

[11] 4,217,582
[45] Aug. 12, 1980

[54] RADAR SYSTEM FOR DETECTING APPROACHING VEHICLES FROM BEHIND

[75] Inventors: Hiroshi Endō, Yokosuka; Masahiro Adachi, Yokohama, both of Japan

[73] Assignee: Nissan Motor Company, Limited, Yokohama, Japan

[21] Appl. No.: 935,908

[22] Filed: Aug. 23, 1978

[30] Foreign Application Priority Data

Sep. 12, 1977 [JP] Japan ................................ 52-108776

[51] Int. Cl.² ........................ B60R 21/00; G01S 7/42; G01S 9/44
[52] U.S. Cl. ............................... 343/7 VM; 180/286; 343/5 NQ
[58] Field of Search ..................... 343/5 NQ, 7 VM; 180/286

[56] References Cited

U.S. PATENT DOCUMENTS

| | | | |
|---|---|---|---|
| 3,420,572 | 1/1969 | Besland | 343/7 VM X |
| 3,760,400 | 9/1973 | Galvin et al. | 343/5 NQ X |
| 3,781,773 | 12/1973 | Ravas | 343/5 NQ X |
| 4,064,511 | 12/1977 | Manfanovsky | 343/5 NQ X |
| 4,095,224 | 6/1978 | Dounce et al. | 343/5 NQ X |

*Primary Examiner*—Malcolm F. Hubler

[57] ABSTRACT

A radar system of the invention transmits a series of microwave burst energy backwardly of stationary vehicle to receive a return signal. When the return signal occurs within a preset time interval, a first and second Doppler signals are derived by mixing the return signal with first and second locally generated oscillations having a phase difference therebetween so that there is a varying phase difference between the first and second Doppler signals depending upon the direction of movement of the detected vehicle. A phase discrimination circuit generates a warning signal when the two Doppler signals have a predetermined phase relation.

4 Claims, 8 Drawing Figures

RADAR SYSTEM FOR DETECTING APPROACHING VEHICLES FROM BEHIND

BACKGROUND OF THE INVENTION

The present invention relates generally to automotive radar systems, and in particular to a radar system for detecting when a moving vehicle of an adjacent lane is approaching a stationary vehicle from behind to prevent the opening of a door of the stationary vehicle whereby possible collision of the vehicle door when opened by a careless passenger against a passing vehicle is avoided.

When a vehicle passenger attempts to get off the vehicle on the side opposite to the sidewalk, he turns around or looks into the rearside mirror before he opens the door in order to ensure that there are no vehicles approaching it from behind to move past on the adjacent lane. However, there is a dangerous situation if the door is opened by a careless passenger when there is another vehicle approaching from behind. Such dangerous situations may also occur if the visibility of the rearside is limited so that the passenger has difficulty in ensuring the absence of any approaching vehicles from behind.

SUMMARY OF THE INVENTION

An object of the present invention is therefore to provide a radar system which ensures safety against possible collision of carelessly opened doors of a stationary vehicle against passing vehicles moving from behind on the adjacent lane.

In accordance with the invention, a series of microwave burst energy is transmitted from a radar antenna backwardly of a vehicle when it comes to a standstill. When a moving vehicle on the adjacent lane enters the detectable range of the radar, a return signal is detected within a preset time from the transmission of the burst energy to indicate the presence of the moving vehicle. A pair of first and second Doppler signals is derived from the detected return signal to determine the direction of movement of the detected vehicle to give a warning signal when the vehicle is approaching the radar from behind. The warning signal is utilized to energize a visual and/or an auible means to alert the occupants of the stationary vehicle of the approaching danger to prevent opening of a vehicle door. Specifically, the first and second Doppler signals is derived from a pair of mixers each providing mixing of the return signal with respectively locally generated oscillations having a phase difference therebetween so that there is a variable phase relation between the two Doppler signals depending on the direction of movement of the detected vehicle.

BRIEF DESCRIPTION OF THE DRAWINGS

The invention will be further described by way of example with reference to the accompanying drawings, in which.

DETAILED DESCRIPTION

Figure 1:
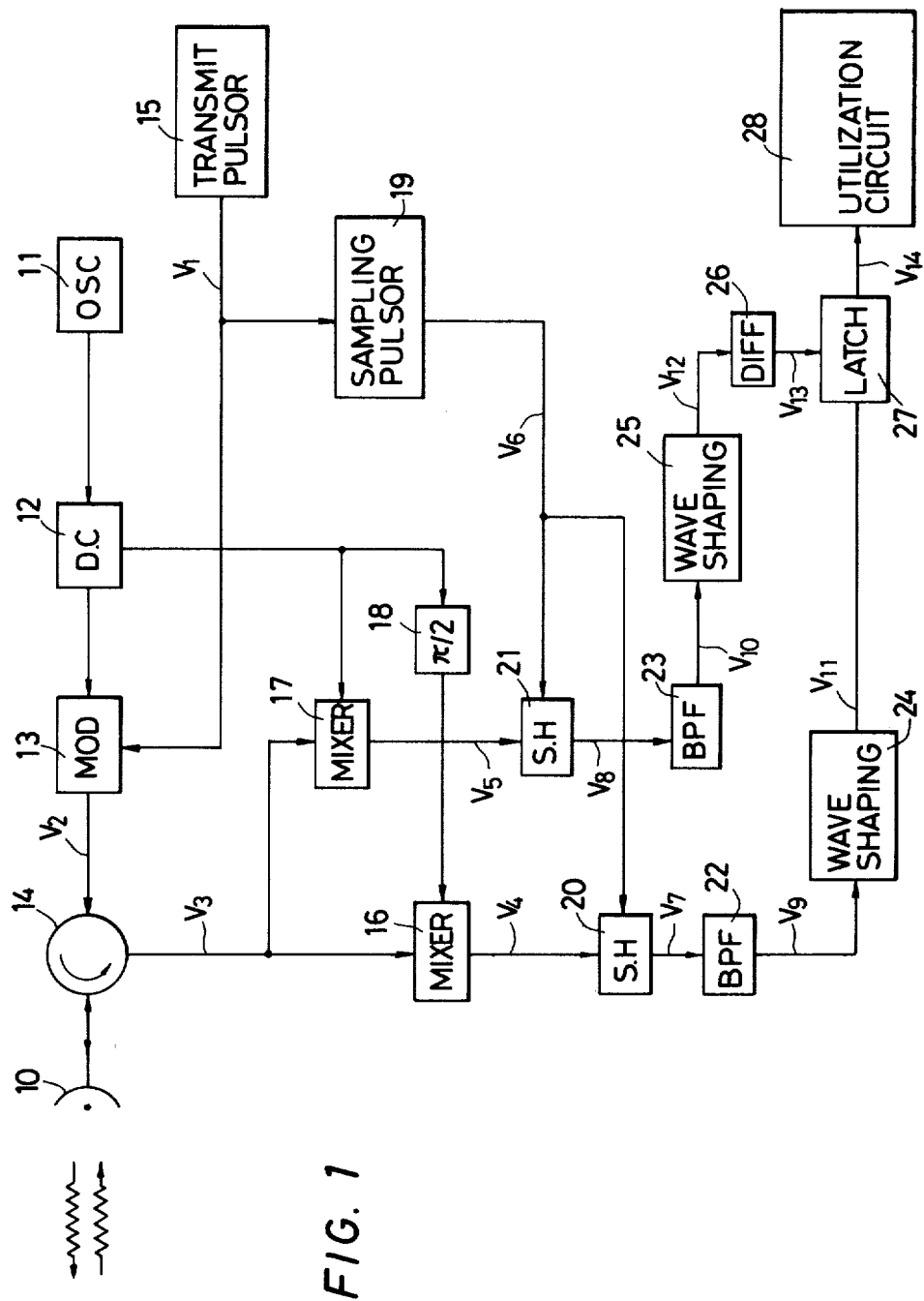
FIG. 1 is a block diagram of the radar system of the invention.
Figure 2:
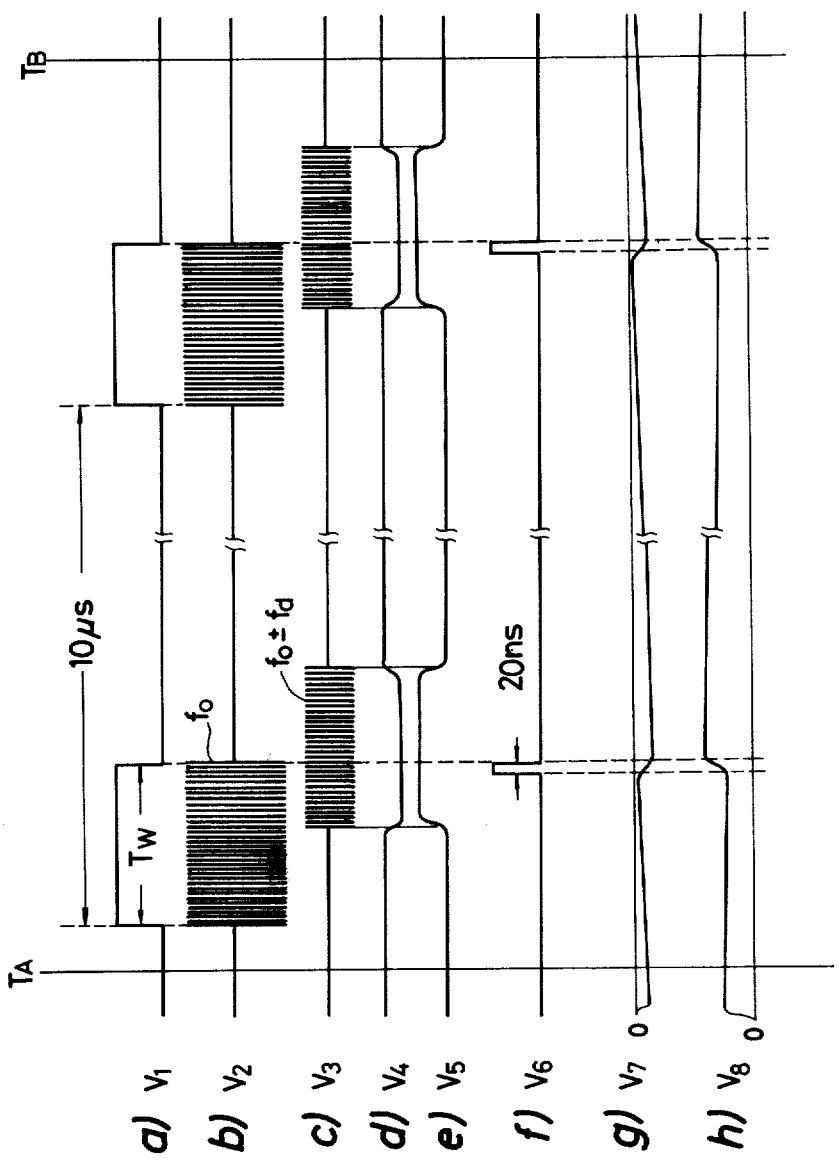
FIGS. 2a-2h, 3a-3f and 4a-4e are timing diagrams useful for understanding the operation of the embodiment of FIG. 1.

Referring now to FIG. 1, a rearward radar warning system of the invention comprises a microwave antenna 10 mounted on the rearside of an automotive vehicle to emit a beam of electromagnetic radiation backwardly of the vehicle and to receive return signals from any passing vehicles on neighboring lanes. The radar transmit signal at a frequency $f_o$ is supplied from a microwave oscillator 11 through a directional coupler 12, a modulator 13 and a circulator 14. A transmit pulsor 15 generates a train of pulses V1 (FIG. 2a) at intervals of 10 microseconds with the duration of each pulse being 400 nanoseconds, for example (see FIG. 2a). This pulse duration is selected at a value $2R_o/C$ where $R_o$ is the maximum detectable range of the radar and C is the propagation velocity of the electromagnetic radiation. The transmit pulses are fed into the modulator 13 to produce a train of burst signals V2 (FIG. 2b) at 10-microsecond intervals.

The transmitted signal undergoes Doppler frequency shift upon reflection from a moving object and the return signal V3 (FIG. 2c) arrives at a delay time $2R/C$ where R is the distance to the object of interest. As is well known in the art, if the moving object is approaching the antenna 10, the frequency of the received signal is higher than the transmission frequency $f_o$ so that the signal V3 is mathematically given by $E_R \sin(2\pi f_o + 2\pi f_d)t$ where $f_d$ is the Doppler frequency and conversely if the object is receding from the antenna 10, the received frequency is lower than the transmission frequency and in this case V3 is given by $E_R \sin(2\pi f_o - 2\pi f_d)t$. The received signal is passed through the circulator 14 to mixers 16 and 17 wherein the signals are mixed with locally generated signals supplied via the directional coupler 12 from the oscillator 11. The local oscillator signal supplied to mixer 16 is shifted in phase by a phase shifter 18 so that there is a phase delay of 90° with respect to the local oscillator signal supplied to mixer 17.

By representing the local oscillator signal supplied to mixer 17 by $E_L \sin 2\pi f_o t$, the phase shifted local oscillator signal to mixer 16 can be expressed by $E_L \sin(2\pi f_o - \pi/2)t$, i.e. $-E_L \cos 2\pi f_o t$. Therefore, the mixing operation in mixer 16 results in a Doppler signal V4 (see FIG. 2d) which is given by $-(E_R E_{Lbl}/2)$ {sin$(2\pi f_o \pm 2\pi f_d)t \pm \sin 2\pi f_d t$}. Likewise, the mixer 17 delivers a Doppler signal V5 (FIG. 2e) which is represented by $-(E_R E_L/2)$ {cos$(2\pi f_o \pm 2\pi f_d)t + \cos 2\pi f_d t$}.

A sampling pulsor 19 receives the transmit pulses from the pulsor 15 and generates a sampling pulse V6 with a duration of 20 nanoseconds such that its trailing edge corresponds to the trailing edge of each transmit pulse V1 (FIG. 2f). The sampling pulse is applied to sample-hold circuits 20 and 21 to detect the instantaneous voltage of the Doppler signals V4 and V5 and hold the sampled voltages at the detected voltage levels. FIGS. 2g and 2h illustrate the waveforms of the output signals from the sample-hold circuits 20 and 21, respectively.

It is appreciated therefore that if an object is moved into the detectable range $R_o$ of the radar, the return signal will be received within the 400-nanosecond interval of the transmit signal V1 so that there is produced a set of output signals V7 and V8 (FIGS. 2g, 2h) from the sample-hold circuits 20 and 21, respectively. The waveforms shown in FIGS. 3a and 3b are the waveforms of signals V7 and V8, respectively, which are depicted on a reduced time scale and in which the time interval $T_A$ to $T_B$ corresponds to the time interval $T_A$ to $T_B$ of FIG. 2.

Figure 3:
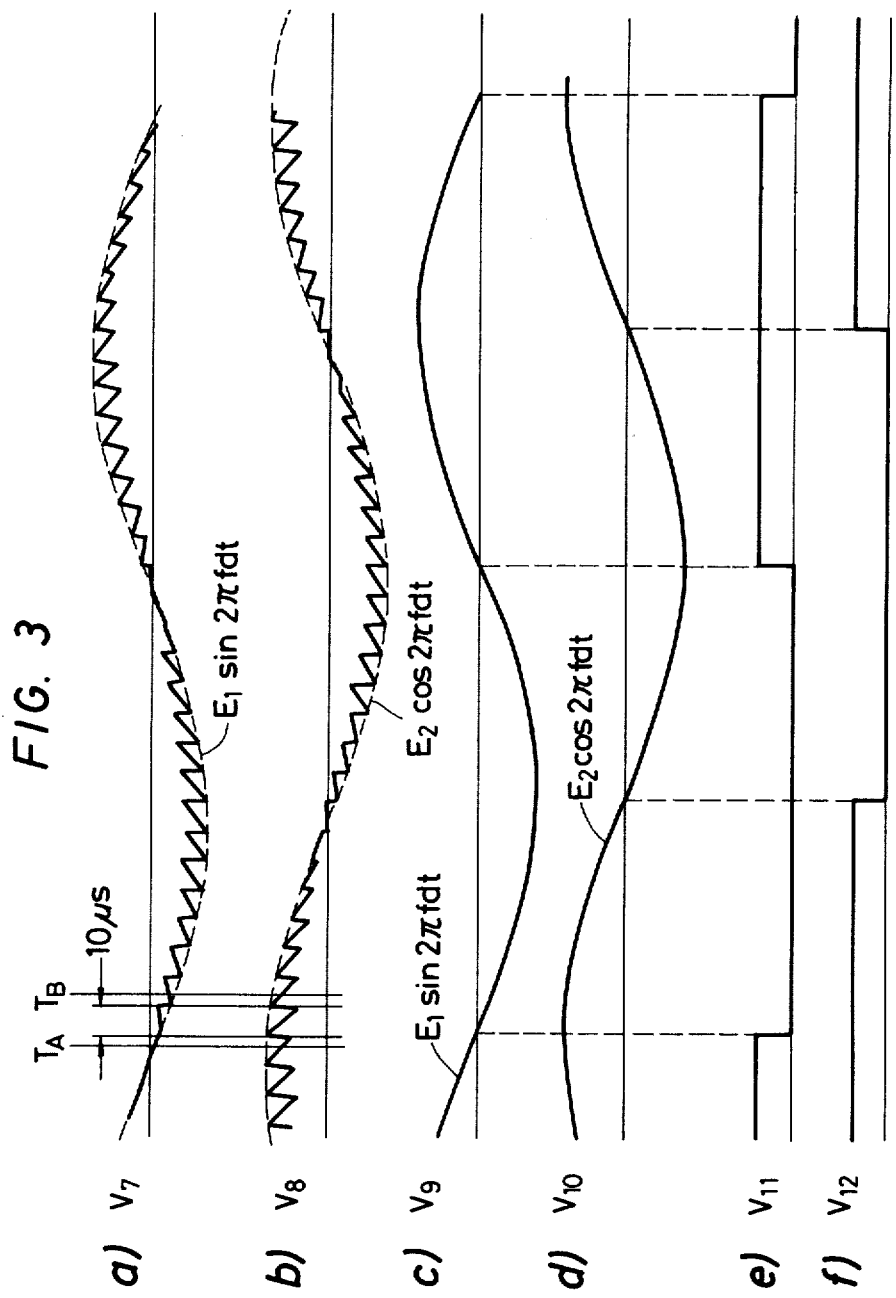

Signals V7 and V8 are then passed through bandpass filters 22 and 23, respectively, to remove their high frequency components to derive signals V9 and V10 which are respectively given by $\pm E_1 \sin 2\pi f_d t$ and $E_2 \cos 2\pi f_d t$ (see FIGS. 3c and 3d). It will be noted that if the object of interest is approaching, the signal V9 has a positive sign and if it is receding V9 has a negative sign.

Signals V9 and V10 are then fed into waveshapers 24 and 25, respectively, to define logic levels so that there appear discrete voltage signals V11 and V12 at the output of the waveshapers 24 and 25, respectively. As previously described, the signal V9 has a different sign depending on the direction of movement of the detected object, while the other signal V10 has a constant sign regardless of the direction of movement of the object, the voltage signal V12 can be used as a reference with respect to the voltage signal V11 to determine whether the object is approaching or receding. For this purpose, a differentiator 26 is provided to differentiate the signal V12 from the waveshaper 25 to derive reference trigger pulses to latch the signal V11 in a latching circuit 27.

Figure 4:
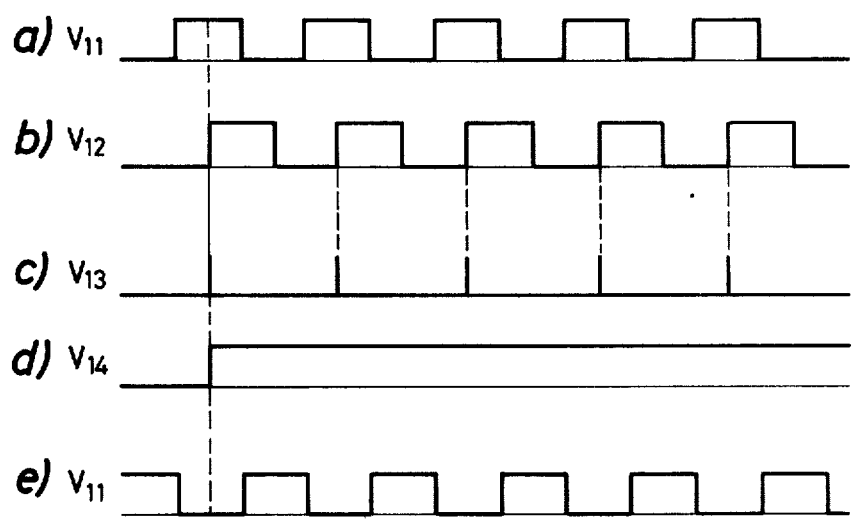

As seen from FIGS. 4a to 4c the trigger pulse V13 is generated in response to the leading edge of the timing reference pulse V12 during the pulse duration of signal V11. This situation occurs when detected object is moving toward the radar. A voltage signal V14 at logic level "1" is stored in the latching circuit 27 (FIG. 4d). Conversely, when the detected object is moving away from the radar, the signal V9 has a negative sign and hence the signal V11 is an inverse of the signal V11 of FIG. 4a so that the trigger pulse V13 occurs during the low level interval of the signal V11 as illustrated in FIG. 4e so that the voltage V14 is at logic level "0".

Therefore, it is understood that the radar warning system of the invention provides a warning signal only when a detected object is approaching the radar antenna 10 from behind the vehicle.

Figure 5:
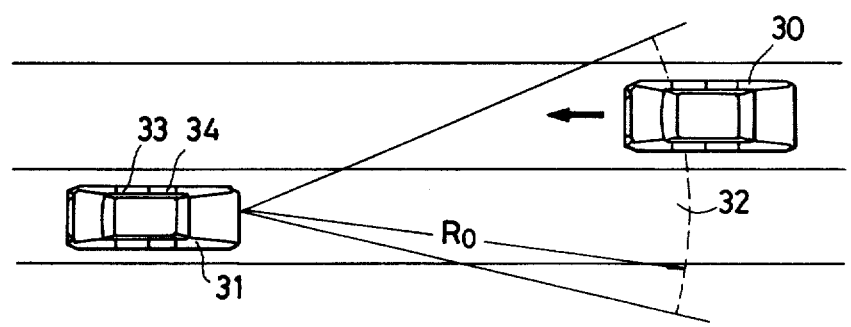
FIG. 5 is a schematic diagram illustrating the detectable range of the radar system of the invention in relation to an approaching vehicle on an adjacent lane.

The warning signal V14 is applied to a utilization circuit 28 to give warning to vehicle occupants against approaching vehicles or lock the vehicle doors to prevent the occupants from opening them under such dangerous conditions. For example, if a vehicle 30 moving on an adjacent traffic lane approaches the radar equipped vehicle 31 now at rest from behind as illustrated in FIG. 5, and the radar system of the invention detects the presence of the vehicle 30 as it enters the detection range Ro (=C.Tw/2 where Tw is the duration of the transmit pulse V1), vehicle occupants are warned of the approaching danger when attempting to open door 33 or 34 until such conditions has cleared off. The radar system of the invention may be energized from a power source (not shown) which remains operated for a certain period of time by means of a timing circuit after removal of the ignition key.

Figure 6:
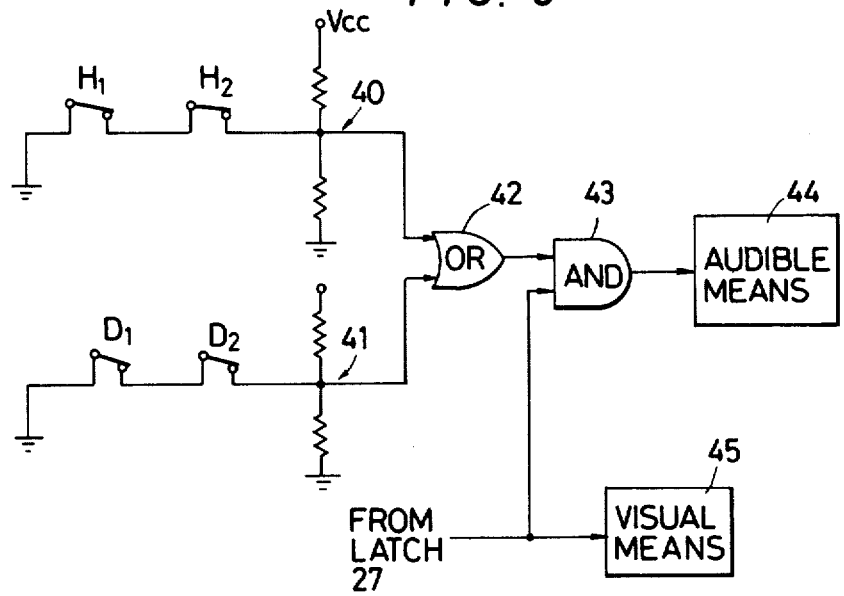
FIG. 6 is a circuit diagram of a utilization circuit of the embodiment of FIG. 1.

FIG. 6 illustrates an example in which an audible warning signal is given when a passenger is attempting to open a door in the presence of an approaching danger. A pair of normally closed contact switches H1 and H2, which are operable to open in response to manual operation of a respective one of inside door opening levers of the doors 33 and 34, is connected in a series circuit between a voltage divider 40 and ground to apply a low level signal under normal conditions through an OR gate 42 to an input of an AND gate 43. In a similar circuit configuration, a pair of normally closed contact switches D1 and D2, which are operable to open in response to the opening of the door 33 or 34 respectively, is connected between a voltage divider 41 and ground to supply a low voltage signal under normal conditions through OR gate 42 to the same input of the AND gate 43. Another input of the AND gate 43 is supplied with the output signal V14 from the latching circuit 27. The output of the AND gate 43 is connected to a suitable audible means 44 such as a buzzer. A visual warning means 45 such as lamps may be connected to the output of the latching circuit 27 to provide a visual indication of the detection of an approaching vehicle from behind.

Figure 7:
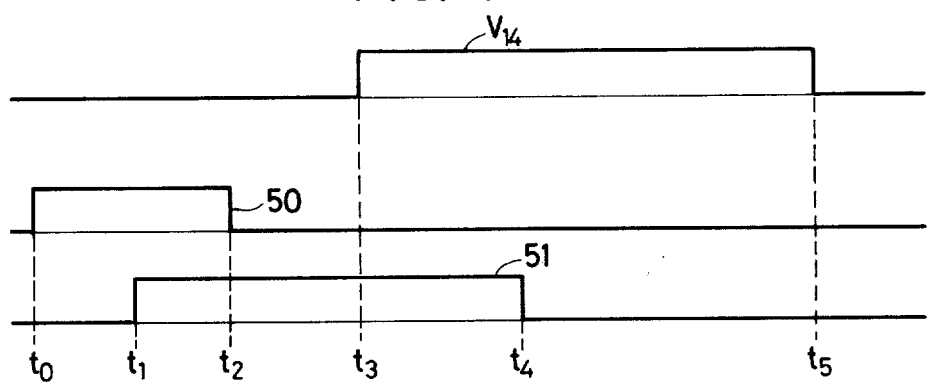
FIGS. 7 and 8 are timing diagrams useful for describing the operation of the circuit of FIG. 6.
Figure 8:
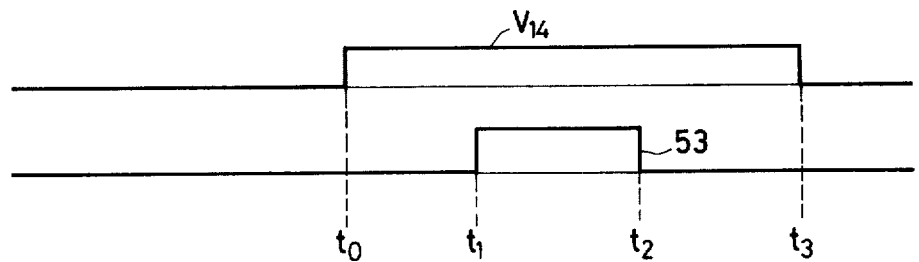

The operation of the circuit of FIG. 6 is best understood with reference to FIGS. 7 and 8. Assuming that switch H1 is operated at time $t_o$ to generate a high level voltage signal 50 which is assumed to be switched off at time $t_2$. The associated door may be opened at time $t_1$ by the opening of switch D1 during the time interval $t_o$ to $t_2$ to generate a high level voltage signal 51. These voltage signals are applied to the AND gate 43 through OR gate 42. While the voltage signal 51 remains high, if a warning signal V14 is supplied from latch 27 at time $t_3$, the AND gate 43 is activated to turn its output to high logic level, thereby activating the audible means 44. The passenger being warned of the dangerous situation closes the door to avoid a possible collision so that at time $t_4$ the signal 51 is switched off. If the visual warning signal, generated in response to the warning signal from latch 27 by the visual means 45, is inadvertently disregarded by the passenger and switch H1 is opened in the presence of the signal V14 subsisting during time interval $t_o$ to $t_3$ (FIG. 8), the audible warning means 44 is activated during time interval $t_1$ to $t_2$.

What is claimed is:

1. An automotive vehicle having a door arranged to open in the path of an adjacent lane by manual operation of a lever attached thereto, comprising:
    a Doppler radar device including an antenna, means for transmitting a beam of electromagnetic radiation from said antenna toward the rear of said vehicle so that Doppler echo signals are returned from vehicles in said adjacent lane and receiving said returned echo signals, and means responsive to said returned echo signals for detecting when said vehicle in said adjacent lane is approaching said radar antenna and generating a warning signal;
    sensing means for detecting when said lever is manually operated to generate a second signal;
    a coincidence gate responsive to the simultaneous presence of said warning signal and said second signal to generate a third signal; and
    audible means responsive to said third signal for generating an audible warning signal.

2. An automotive vehicle as claimed in claim 1, further comprising visual means responsive to the first-mentioned warning signal to generate a visual warning signal.

3. An automotive vehicle as claimed in claim 1, or 2, further comprising second sensing means for detecting when said door is open to generate a fourth signal, said second and fourth signals being applied to said coincidence gate through an OR gate.

4. An automotive vehicle as claimed in claim 1, wherein said Doppler radar device comprises means for detecting when said returned echo signals are received within a predetermined interval of time from the time of transmission of said electromagnetic radiation and means for detecting a Doppler frequency shift of the received echo signals to generate said first-mentioned warning signal when said Doppler frequency shift represents that the vehicle in said adjacent lane is approaching said radar antenna.

* * * * *